April 19, 1938. J. C. BUCKBEE 2,114,674
ROTARY INTERNAL COMBUSTION ENGINE
Filed Dec. 13, 1934 2 Sheets-Sheet 1

Inventor:
John C. Buckbee,
By Cromwell Greist Warden attys.

April 19, 1938.   J. C. BUCKBEE   2,114,674
ROTARY INTERNAL COMBUSTION ENGINE
Filed Dec. 13, 1934   2 Sheets-Sheet 2

Inventor:
John C. Buckbee,
By Cromwell Geist & Harden
attys.

Patented Apr. 19, 1938

2,114,674

UNITED STATES PATENT OFFICE 2,114,674

ROTARY INTERNAL COMBUSTION ENGINE

John C. Buckbee, Los Angeles, Calif.

Application December 13, 1934, Serial No. 757,346

4 Claims. (Cl. 123—16)

The primary object of the present invention is the provision of a rotary explosive motor the construction of which is such that it may be built at greatly reduced cost as compared with that of present type motors; one that will give torque characteristics similar to an electric motor; one that involves substantially no balancing problems, and one that is relatively easy to maintain.

In the reciprocating piston type of explosive motor the compression volume and expansion volume necessarily are equal, being limited in both cases to the stroke of the piston, which results in a comparatively high terminal pressure for the expanding gases. This restricts the expansion terminal pressure and hence the efficiency of the motor. For instance, in the usual automobile engine a charge of gas and air is drawn into the cylinder at somewhere near atmospheric pressure or 15 pounds (absolute) on the suction stroke of the piston. On the following compression stroke this volume of gas and air is compressed to, say, one quarter of its volume at atmospheric pressure, and its pressure thereby is increased to around 73 pounds (absolute). On ignition the combustion raises the pressure to around 272 pounds (absolute), but the final expansion volume is limited to the original pre-compression volume, or, in this instance, to four times the explosion volume. Hence, the terminal pressure of the expanding gases will be about 45 pounds (absolute) or, say, 30 pounds gauge when the piston reaches the end of the stroke and the exhaust valve opens. Obviously, for the best efficiency the terminal pressure should fall to atmospheric pressure or, say, 15 pounds (absolute).

The present invention contemplates a motor wherein the expansion ratio can be made much greater than the compression ratio, thereby enabling a much lower terminal pressure to be attained, and thus adding to the extent of the gas expansion and the efficiency of the motor.

A further object of the invention is the provision of a motor of the character mentioned which embodies novel means for effecting its lubrication and for preventing gas leakage between the casing and the moving parts.

A further object sought to be attained by the present invention is the provision of a rotary motor of the type referred to which includes a multi-stage construction for compression of the explosive charge and utilization of the latter in the application of its expansive force when fired, the arrangement being such as to insure a high degree of compression of the charge, expansion of the gas to the fullest extent when the same has been ignited, and clearance of the motor of the spent gases at relatively low pressure so as to promote the highest efficiency of the motor.

Other objects and advantages will appear as the nature of the improvements is better understood, the invention consisting substantially in the novel construction, combination and arrangement of parts hereinafter fully described, illustrated in the accompanying drawings, and finally pointed out in the appended claims.

While the form of invention herein shown and described is believed to be a practical embodiment thereof for the purposes for which it is intended, it is to be understood that the invention is not to be limited thereto, being capable of incorporation in other forms, and susceptible to change, modification and variation within the scope of the appended claims.

In the drawings

Figure 1:
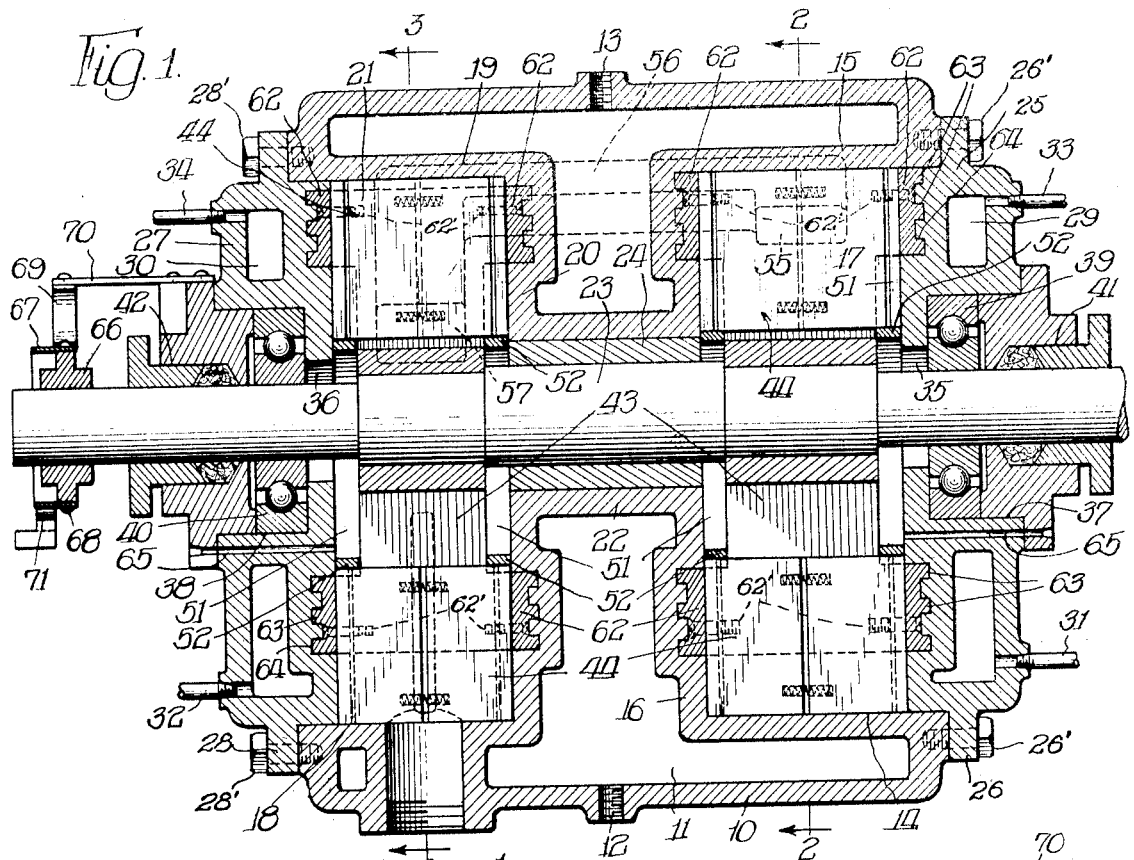
Fig. 1 is a longitudinal sectional view, as on the line 1—1, Fig. 2, of a rotary internal combustion engine constructed in accordance with the present invention.

Referring now in detail to the accompanying drawings, the numeral 10 designates the body of the herein-described motor. This is in the form of a shell generally circular in cross section and having an internal space 11 for receiving a cooling fluid. The latter is admitted through an inlet 12 and exhausted through an outlet 13.

It has been stated that the present motor includes a multi-stage arrangement for effecting compression of the explosive charge and utilization of the latter in the application of its expansive force when fired. To this end the body 10 is provided at one of its ends with a circular chamber 14 constituted by an inwardly directed horizontal wall 15 at the inner end of which is located a vertical wall 16. Within the chamber 14 is located a rotor 17 which, with the chamber 14, constitutes the compression stage of the motor.

At the opposite end of the body 10 the same is provided with a circular chamber 18, corresponding to the chamber 14, said chambers thus being arranged abreast. This is constituted by an inwardly directed horizontal wall 19 at the inner end of which is located a vertical wall 20. Within the chamber 18 is located a rotor 21 which, with the chamber 18, comprises the explosion stage of the motor.

Connecting the walls 16 and 20 is a bearing sleeve 22 in which is fitted a shaft 23 that is common to the rotors 17 and 21. The shaft 23 is surrounded by a suitable bearing bushing 24 that is interposed between the shaft and the sleeve 22.

The open end of the compression chamber 14 has a closure head 25 fitted thereto, said head being provided with an overlapping flange 26 which may be suitably fastened to the body 10, as by appropriate bolts 26' or similar fastenings, to establish a gas-tight joint between the head 25 and the body 10. A similar closure head 27 also is fitted to the explosion chamber 18, which head 27 is provided with an overlapping flange 28 which may be suitably fastened to the body 10, as by appropriate bolts 28' or similar fastenings, to establish a gas-tight joint between the head 27 and the body 10. The closure heads 25 and 27 are provided, respectively, with internal spaces 29 and 30 for receiving a cooling fluid, the latter entering each of the spaces 29 and 30 through inlets 31 and 32 and being exhausted through outlets 33 and 34.

Formed at the central portions of the closure heads 25 and 27 are shaft openings 35 and 36, the ends of the shaft 23 projecting through said openings to the exterior of the casing 10 and the respective closure heads. The openings 35 and 36 communicate with pockets or recesses 37 and 38 with which the heads 25 and 27 are provided, and in these pockets or recesses are located ball bearings 39 and 40 for the ends of the shaft 23. Stuffing boxes 41 and 42 are provided for the ends of the shaft 23 where they pass through the closure heads 25 and 27 so as to prevent oil leakage about the ends of the shaft 23.

By referring to Fig. 1 it will be observed that the rotor 17 is of greater width than the width of the rotor 21, the chamber 14 being correspondingly larger than the chamber 18. The purpose of this will appear at a later point herein.

Figure 2:
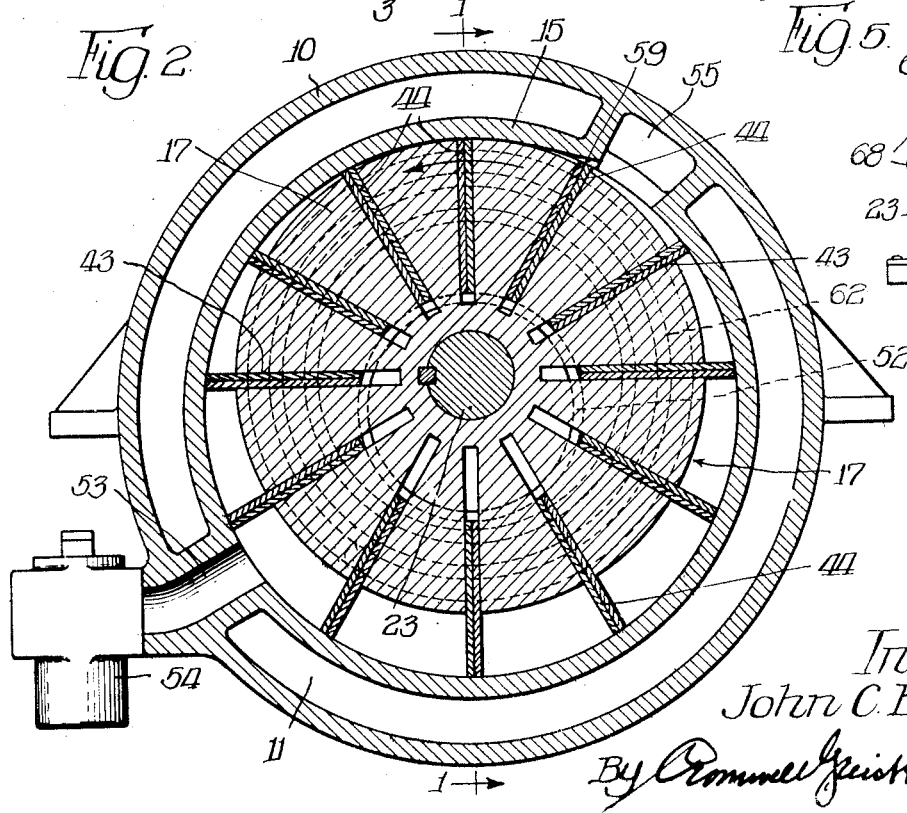
Fig. 2 is a transverse sectional view thereof taken on the line 2—2, Fig. 1.
Figure 3:
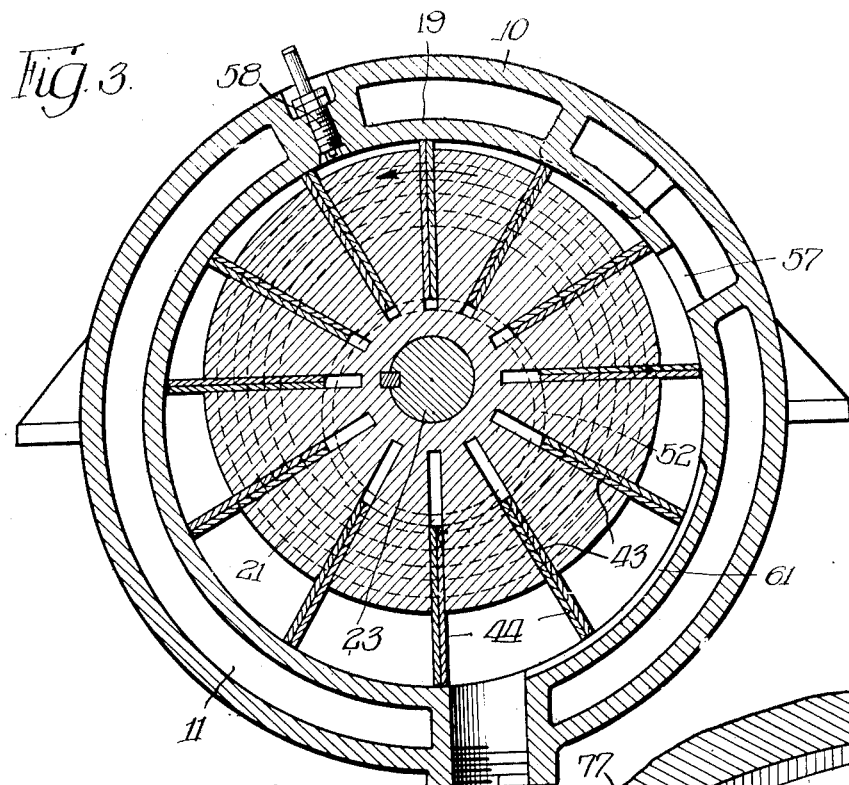
Fig. 3 is a similar view, as on the line 3—3, Fig. 1.
Figure 4:
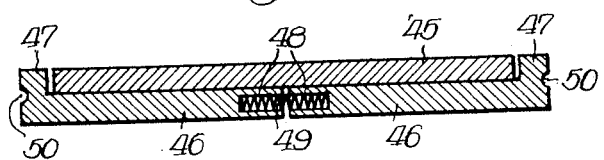
Fig. 4 is a transverse sectional view of one of the sliding vanes employed with the rotors.

The rotors 17 and 21 are positioned eccentrically within the chambers 14 and 18, the shaft 23 being positioned in eccentric relation to the longitudinal axis of the body 10, and the diameter of the rotor 21 is slightly less than the diameter of the rotor 17, as will appear from a comparison of Figs. 2 and 3. The purpose of this also will appear at a later point herein.

Inasmuch as the construction of the rotors 17 and 21 otherwise are the same, the description of one will suffice for the other.

As shown in Figs. 2 and 3, the rotors are provided with a series of radial slots 43 which extend the full width of the rotors. Within these slots 43 are located a plurality of sliding vanes 44. They correspond in width to the width of the rotors, and the side edges of the vanes are designed to contact with the inner faces of the closure heads 25 and 27 and of the walls 16 and 20 and to work over the same in the rotation of the rotors.

A preferred construction of the sliding vanes 44 is illustrated in Figs. 1 to 4, inclusive. Each vane consists of a main body plate 45, which is of integral construction, and with which is associated a pair of supplemental body plates 46 having vertical flanges 47 at their outer edges that embrace the edges of the main body plate 45. The contiguous edges of the supplemental body plates 46 are provided with recesses 48 that receive coil springs 49 to afford yielding movement between the plates 46, and at the same time to exert an expansive force on the plates 46 so as to spread them apart, thereby maintaining the outer edges of these plates in contact with the inner walls of the closure heads 25 and 27 and the faces of the walls 16 and 20. The flanges 47 of the plates 46 are grooved, as at 50, for the admission of oil employed for lubricating the rotors, and the oil entering these grooves 50 will act as a seal between the edges of the vanes 44 and the walls of the chambers 14 and 18 so as to preclude the passage of gas between the edges of the vanes and such walls.

It is to be observed that there is some small end clearance between the plates 45 and 46. When there is gas or air pressure on the face of the vanes, as appears when the motor is in operation, this gas under pressure will enter the clearance spaces and force the ends of the plates against the sides of the casing and the closure heads, and thereby assist in reducing the leakage between the moving vanes and the stationary casing or body. The coil springs 49, when the motor is starting, will urge the supplemental body plates 46 against the sides of the casing and the closure heads so as to provide tight joints or points of contact thereat, but this action of the springs 49 is supplemented by the gas which enters the clearance spaces between the plates 45 and 46, after the motor is in operation.

At opposite sides of each of the rotors 17 and 21 a recess or depression 51 is formed, said recesses or depressions being concentric with the shaft 23. Within each one of these recesses or depressions 51 is located an elastic ring 52, formed of metal having sufficient resiliency for the purpose intended. The inner ends of the sliding vanes 44 are in contact with these elastic rings, the outer ends of the vanes contacting the inner surfaces of the chambers 14 and 18 and riding over such surfaces in the movement of the rotors within their respective chambers. Due to the elasticity of the rings 52 the vanes 44 are pressed outwardly and their outer ends are maintained in contact with the inner surfaces of the chambers 14 and 18. Because of the eccentric mounting of the rotors within their respective chambers, it is obvious that as the outer ends of the vanes move over the inner surfaces of the chambers they will slide in and out of their respective slots 43, but in all the movement of the vanes during such rotation their outer ends will remain in contact with the inner surfaces of the chambers. In the case of the rotor 17, its eccentric mounting within the chamber 14 is such that the upper portion of its perimeter lies in close relation to the upper portion of the inner surface of the chamber 14, the spaces at either side of the rotor 17 being tapered and gradually increasing in size to the extreme lower portion of the casing 14. This casing has formed in its lower left hand sector, as viewed in Fig. 2, an inlet port 53 for introduction of the explosive charge, which charge may be fed to said port 53 from a carburetor 54, or other suitable source. As the explosive charge enters the chamber 14 through the port 53 it also enters the spaces between the several vanes 44. The rotor 17 operates in a counterclockwise direction, as indicated by the arrow in Fig. 2. During such rotation the explosive charge passes upwardly in the tapering space in the lower right hand sector of the chamber 14 and, due to the tapering form of that space, the charge is compressed until it reaches the upper right hand sector of the chamber. At this point is located a discharge port 55 which forms one terminus of a connecting duct 56 that is formed in the body 10 and extends from the chamber 14 to the chamber 18. In the chamber 18, at the upper right hand sector thereof, as illustrated in Fig. 3, is formed an inlet port 57, and said port communicates with the space at the upper right hand sector of the chamber 18, formed between the rotor 21 and the inner surface of the chamber 18. The compressed charge thus delivered into the chamber 18 through the port 57 is received in the tapering space referred to, and in the counterclockwise rotation of the rotor 21, as illustrated by the arrow in Fig. 3, the charge receives further compression. The maximum degree of that compression is attained at the top of the perimeter of the rotor 21, at which point, as will be seen from Fig. 3, there is a relatively narrow space between that portion of the rotor 21 and the adjacent inner surface of the chamber 18. In the further rotation of the rotor 21 the explosive charge, compressed to the maximum degree mentioned, is carried into the upper left hand sector of the chamber 18 at which point is located a spark plug 58, and at this point ignition takes place. At an earlier point herein reference has been made to the fact that the rotor 17 is of greater width than the width of the rotor 21, the chamber 14 being correspondingly larger in width than the chamber 18. This is necessary as it is obvious that the intake capacity of the rotor 21 opposite the inlet port 57 is much larger than the discharge capacity of the rotor 17 opposite the discharge port 55, so far as the relative cross-sectional areas are concerned. Hence, to have the volume of gas discharged from the rotor 17 and its casing equal the volume taken in by the rotor 21 and its casing, without a drop in pressure, the length or width of the rotor 17 must exceed that of the rotor 21 when these rotors are of substantially the same diameter.

The diameter of the rotor 21 is only slightly less than that of the rotor 17. This is for the reason that the function of the rotor 17 is limited, on the right hand sector, to compression of the incoming gas and discharge of the same through the port 55, the diameter being such that the upper portion of the perimeter of the rotor 17 will almost touch the upper inner surface of the casing 14. In the case of the rotor 21 the gas is compressed in the right hand sector and then carried by the movement of the rotor to the left hand sector for burning and expansion. To provide for this the diameter of the rotor 21 must be such as to provide the space hereinbefore mentioned between the upper portion of the perimeter of the rotor 21 and the upper portion of the inner surface of the casing 18 to convey the required quantity of the compressed gas to the ignition point at the spark plug 58.

Formed in the inner face of the chamber 14, and in communication with the discharge port 55, is a discharge groove 59, its purpose being to lead the small quantity of compressed gas from the final upper right hand sector of the rotor 17 to the discharge port 55, thereby clearing the chamber 14 of all compressed gas at the discharge port 55.

For removal of the spent gases from the explosion chamber 18 an exhaust port 60 is formed in the body 10 and communicates with the chamber 18 at its lowest point. Hence, after ignition of the explosive charge and its expansion, the spent gases are conveyed to the exhaust port 60 through which they pass to the atmosphere.

In the rapid rotation of the rotor 21 a portion of the spent gases may be driven beyond the exhaust port 60. In such event it is desirable to prevent re-compression of the spent gases passing the exhaust port. To the accomplishment of this a discharge groove 61 is formed in the inner wall of the chamber 18, one end of said groove being in communication with the discharge port 60. The groove 61 extends a sufficient distance along the inner wall of the chamber 18 so that any spent gases which are driven beyond the port 60 may pass back to the latter through the groove 61 and be exhausted through the port 60.

As a further means of reducing leakage of gas between the sides of the rotors 17 and 21, the inner walls of the closure heads 25 and 27, and the walls 16 and 20, a plurality of sealing rings 62 is employed. These rings are circular in form, conforming to the circular contour of the rotors 17 and 21. One of these sealing rings 62 is applied to each side face of each of the rotors and secured thereto as by screws 62' or their equivalents. The diameters of the rings 62 coincide with the diameters of the rotors 17 and 21. The outer face of each of the rings 62 is provided with a plurality of circular ribs 63 which are concentrically related with respect to each other, said ribs being fitted to and working within a series of grooves 64 that are formed in the inner faces of the closure heads 25 and 27 and the walls 16 and 20, said grooves also being concentrically related with respect to each other. The arrangement described provides a modified type of labyrinth seal and serves to reduce leakage of gas between the sides of the rotors and the sides of the casings or chambers which they occupy. It is obvious that lubricating oil surrounding the shaft 23 and occupying the recesses 51, due to centrifugal action, will enter the grooves 64 and assist the ribs 63 in providing the seal referred to.

To the end that the hereindescribed motor may be properly lubricated, each of the closure heads 25 and 27 is provided with an oil duct 65, the inner ends of these ducts communicating with the outermost recesses or depressions 51 of the chambers 14 and 18. Through these oil ducts lubricating oil may be introduced under pressure to the recesses or depressions 51. The oil will flood the recesses 51 for the elastic rings 52 on both sides of the rotors, likewise the spaces in the radial slots 43 of the rotors under the sliding vanes 44 thereof, and work into the end bearings 38 and 39, as well as the center sleeve 22 and its bearing 24. It is also obvious that when the motor is running the movement of the vanes 44 in their respective slots plus centrifugal force will result in the lubricating oil working outwardly from the center of the rotors on both sides and both ends of each vane, and that the oil also will work outwardly from the center of the rotors between the sides of the rotors and the sides of the chambers or casings which they occupy. The oil from both the vanes and the sides of the rotors also will be thrown to the interior surfaces of the chambers 14 and 18 against which the outer ends of the vanes 44 bear. All interior working parts of the motor, therefore, will be continuously lubricated automatically.

Figure 5:
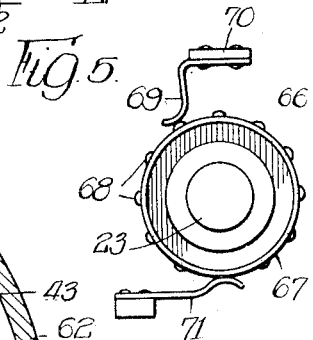
Fig. 5 is a detail elevation of the distributer for making and breaking the ignition circuit.

The mechanism for making and breaking the electrical circuit in which the spark plug 58 is included, and for timing the flow of current thereto for energizing the spark plug is illustrated in Figs. 1 and 5. The circuit connections are not disclosed as these may be of the usual arrangement for energizing the spark plug with current of the required intensity. This mechanism includes a hub 66 formed of suitable insulating material, which hub is mounted upon the shaft 23 and secured thereto for rotation therewith. Surrounding the hub 66 is a contact ring 67, which may be formed of suitable metal to afford the required conductivity for the electrical current. The contact ring 67 is relatively broad and the same is provided with a plurality of spaced contact heads 68 arranged at regular intervals around said ring. The number of these contact heads corresponds to the number of the sliding vanes carried by the rotor 21. They are arranged circumferentially of the ring 67 so as to move under and successively engage a contact finger 69 which is supported by a bracket 70 carried by the casing or body 10 of the motor, and thereby to be electrically connected with the shell of the spark plug 58. Obviously, current will flow through the contact finger 69 only when it engages the contact heads 68, the finger 69, when it occupies a position between the contact heads, having no engagement with the ring 67. A fixed contact finger 71 bears upon the ring 67 continuously, this fixed contact finger being included in the circuit connections leading from the source of current and serving to energize the ring 67 continuously from such source.

Figure 6:
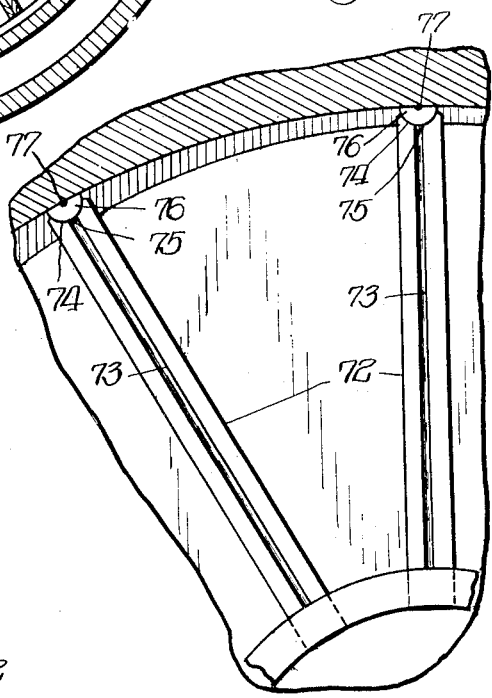
Fig. 6 is a fragmentary elevation of one of the rotors equipped with another form of sliding vane.
Figure 7:
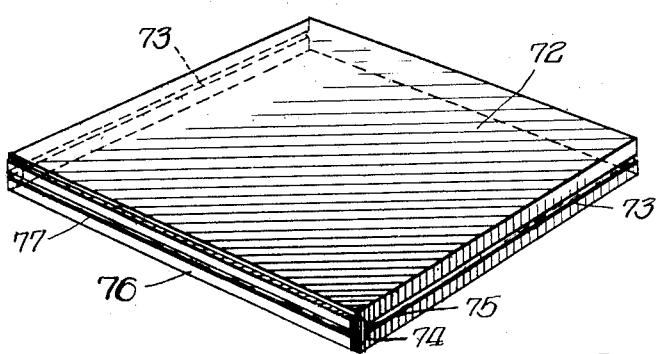
Fig. 7 is a perspective view of one of the vanes shown in Fig. 6.

In Figs. 6 and 7 is illustrated another form of sliding vane which may be substituted for the vanes 44 illustrated in Figs. 1 to 4, inclusive. In this alternative form the vane comprises a body plate 72 of integral construction, its opposite side faces or edges being provided with grooves 73 for receiving lubricating oil. The outer end of the body plate 72 is provided with a bearing groove 74, said groove extending throughout the entire width of the plate 72. This groove 74 is substantially semi-circular in cross-sectional contour and is provided at its low point with a groove 75 the ends of which communicate with the grooves 73 so as to feed oil from the grooves 73 to the groove 75. Fitted within the groove 74 is a shoe 76, which shoe is substantially semi-circular in cross-sectional contour in order to conform to the shape of the groove 74. The outer or bearing face of the shoe 76 is somewhat curved to fit the inner wall of the casing or chamber in which the rotor with which the vane is associated operates. This outer or bearing face of the shoe 76 is also provided with a lubricating groove 77. Obviously, the oil in the grooves 73, 75 and 77 will assist in maintaining a tighter joint between the parts, the oil having a tendency to act as a flexible hydraulic packing.

In the operation of the alternative form of vane shown in Figs. 6 and 7 the shoe 76 will rotate sufficiently in the groove 74 to keep its curved face normal to the bore of the chamber or casing occupied by the rotor, thus not only maintaining a tighter joint between the casing and the vane, but providing also a broader wearing surface.

The operation of the hereindescribed motor will be clear from the preceding description of its structural features, but briefly stated it is as follows:

It being understood that the shaft 23 and the rotors 17 and 21 rotate in a counterclockwise direction, and that initial movement to the shaft 23 may be imparted thereto either by hand or by automatic starting mechanism now commonly employed with explosive motors, the initial movement of the shaft 23 and the rotors will induce inward flow of the explosive charge or mixture through the port 53 from the carburetor 54 or other suitable source. This flow will be in the form of a continuous stream so long as the motor is operating. As the explosive mixture enters the chamber 14 it will be given its initial compression in the space in the right hand sector of the chamber 14 between the rotor 17, the wall of the chamber and the vanes 44. After the charge has reached the maximum degree of this initial compression the same passes through the discharge port 55 into the duct 56 and enters the chamber 18 through the port 57. Here the charge is given further and final compression between the rotor 21, the wall of the chamber 18 and the vanes 44 of the rotor 21. The compression reaches its maximum at the point where the rotor 21 most closely approaches the inner wall of the casing or chamber 18. Further rotation of the rotor brings the compressed mixture to the spark plug 58. At an appropriate point in the rotation of the distributer the spark plug 58 becomes energized, thereby igniting the charge, and the resulting combustion causes a rapid rise in both the pressure and temperature of the gaseous mixture. As a result of the increased pressure on the vane 44 which is immediately next to the spark plug 58, but on the side thereof in the direction of movement of the rotor 21 toward the exhaust 60, the rotor is moved under the force of the explosion. Expansion of the gas takes place because of the widening space between the rotor 21 and the wall of the casing or chamber 18. The pressure of the gas on the vanes of the rotor propels the latter forwardly until the exhaust port 60 is reached, where the spent gases are expelled. As previously indicated, any spent gases which may be driven past the exhaust port 60 will be forced into the groove 61 and returned to the exhaust port 60.

It has been pointed out that in the reciprocating type of gas engine the compression ratio and expansion ratio are the same, being limited in both cases to the stroke of the piston which results in a comparatively high terminal pressure for the expanding gases. It is obvious however that in the rotary motor hereindescribed the expansion ratio can be made much greater than the compression ratio, and hence a much lower terminal pressure obtained, thus adding to the extent of the gas expansion and the efficiency of the motor. The terminal pressure obtained by the hereindescribed motor approximates very closely atmospheric pressure.

I claim:

1. A rotary explosive motor, comprising a body having a compressor chamber and a motor chamber arranged abreast, rotors arranged in said chambers, a shaft passing through said body and connected to said rotors, radially movable vanes carried by said rotors, means for maintaining said vanes in contact with the walls of said chambers, the compressor chamber having a fuel inlet port and a discharge port, the rotor of said compressor chamber being eccentrically mounted therein and providing a compression space between the rotor and the wall of the chamber, said space tapering in opposite directions to the fuel inlet and said discharge port, whereby fuel entering said inlet is given an initial compression by the rotor in its movement from said inlet to said discharge port, the rotor of said motor chamber being eccentrically mounted therein but spaced from the walls thereof and providing oppositely-disposed compression and expansion spaces and a relatively narrow combustion chamber intermediate the compression and expansion spaces, ignition means located at the combustion chamber, the motor chamber having a discharge port intermediate the expansion and compression spaces and an inlet port in communication with the compression space at a point intermediate said combustion chamber and said discharge port, and means connecting the discharge port of the compressor chamber with the inlet port of the motor chamber for transferring the initially-compressed charge from the compressor chamber to the motor chamber.

2. A rotary explosive motor, comprising a body having a compressor chamber and a motor chamber arranged abreast, rotors arranged in said chambers, a shaft passing through said body and connected to said rotors, radially-movable vanes carried by said rotors, means for maintaining said vanes in contact with the walls of said chambers, the compressor chamber having a fuel inlet port and a discharge port at substantially opposite points in the compressor chamber, the rotor of said compressor chamber being eccentrically mounted therein and providing a compression space between the rotor and the wall of the chamber, said space tapering in opposite directions to the fuel inlet and said discharge port, whereby fuel entering said inlet is given an initial compression by the rotor in its movement from said inlet to said discharge port, the rotor of said motor chamber being eccentrically mounted therein but spaced from the walls thereof and providing oppositely-disposed compression and expansion spaces and a relatively narrow combustion chamber intermediate the compression and expansion spaces, ignition means located at the combustion chamber, the motor chamber having a discharge port intermediate the expansion and compression spaces and an inlet port in communication with the compression space at a point intermediate said combustion chamber and said discharge port, and means connecting the discharge port of the compressor chamber with the inlet port of the motor chamber for transferring the initially-compressed charge from the compressor chamber to the motor chamber.

3. A rotary explosive motor, comprising a body having a compressor chamber and a motor chamber arranged abreast, rotors arranged in said chambers, a shaft passing through said body and connected to said rotors, radially-movable vanes carried by said rotors, means for maintaining said vanes in contact with the walls of said chambers, the compressor chamber having a fuel inlet port and a discharge port, the rotor of said compressor chamber being eccentrically mounted therein and providing a compression space between the rotor and the wall of the chamber, said space tapering in opposite directions to the fuel inlet and said discharge port, whereby fuel entering said inlet is given an initial compression by the rotor in its movement from said inlet to said discharge port, the rotor of said motor chamber being eccentrically mounted therein but spaced from the walls thereof and providing oppositely-disposed compression and expansion spaces and a relatively narrow combustion chamber intermediate the compression and expansion spaces, ignition means located at the combustion chamber, the motor chamber having a discharge port intermediate the expansion and compression spaces and an inlet port in communication with the compression space at a point intermediate said combustion chamber and said discharge port, the compression and expansion spaces having their greatest area at said discharge port and tapering in opposite directions therefrom to said combustion chamber, and means connecting the discharge port of the compressor chamber with the inlet port of the motor chamber for transferring the initially-compressed charge from the compressor chamber to the motor chamber.

4. A rotary explosive motor comprising a body having a compressor chamber and a motor chamber arranged abreast, rotors arranged in said chambers, a shaft passing through said body and connected to said rotors, radially-movable vanes carried by said rotors, means for maintaining said vanes in contact with the walls of said chambers, the compressor chamber having a fuel inlet port and a discharge port arranged at substantially opposite points diametrically of said compressor chamber, the rotor of said compressor chamber being eccentrically mounted therein and providing a compression space between the rotor and the wall of the chamber, said space tapering in opposite directions to the fuel inlet and said discharge port, whereby fuel entering said inlet is given an initial compression by the rotor in its movement from said inlet to said discharge port, the rotor of said motor chamber being eccentrically mounted therein but spaced from the walls thereof and providing oppositely-disposed compression and expansion spaces and a relatively narrow combustion chamber intermediate the compression and expansion spaces, ignition means located at the combustion chamber, the motor chamber having a discharge port intermediate the expansion and compression spaces and an inlet port in communication with the compression space at a point intermediate said combustion chamber and said discharge port, the compression and expansion spaces having their greatest area at the discharge port and tapering in opposite directions to said combustion chamber, and means connecting the discharge port of the compressor chamber with the inlet port of the motor chamber for transferring the initially-compressed charge from the compressor chamber to the motor chamber.

JOHN C. BUCKBEE.